(12) United States Patent
Backes et al.

(10) Patent No.: US 8,747,529 B2
(45) Date of Patent: Jun. 10, 2014

(54) DEVICE FOR DRYING A MEDIUM FLOW

(75) Inventors: Volker Backes, Marpingen (DE); Achim Pfeiffer, Friedrichsthal (DE); Jan Weber, Saarbrücken (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 0 days.

(21) Appl. No.: 13/261,263

(22) PCT Filed: Oct. 1, 2010

(86) PCT No.: PCT/EP2010/006009
§ 371 (c)(1),
(2), (4) Date: Jun. 8, 2012

(87) PCT Pub. No.: WO2011/044992
PCT Pub. Date: Apr. 21, 2011

(65) Prior Publication Data
US 2012/0247339 A1 Oct. 4, 2012

(30) Foreign Application Priority Data
Oct. 16, 2009 (DE) .......................... 10 2009 049 546

(51) Int. Cl.
*B01D 53/02* (2006.01)
(52) U.S. Cl.
USPC ............... 96/132; 955/117; 955/118; 96/121; 96/131; 96/134; 96/136

(58) Field of Classification Search
USPC .............. 95/117, 118; 96/121, 131, 132, 134, 96/136
See application file for complete search history.

(56) References Cited

U.S. PATENT DOCUMENTS

| 3,972,129 | A | 8/1976 | Graff | |
|---|---|---|---|---|
| 4,624,789 | A * | 11/1986 | Fan et al. ....................... | 210/661 |
| 6,176,897 | B1 * | 1/2001 | Keefer ................................ | 95/98 |
| 6,217,639 | B1 | 4/2001 | Jackson | |
| 6,623,549 | B1 | 9/2003 | Evans et al. | |
| 2007/0227361 | A1 * | 10/2007 | Kasuya ........................... | 96/135 |
| 2008/0148937 | A1 | 6/2008 | Rege et al. | |

FOREIGN PATENT DOCUMENTS

| DE | 69722215 | 5/2003 |
|---|---|---|
| WO | 2005089237 | 9/2005 |
| WO | 2007106958 | 9/2007 |

* cited by examiner

*Primary Examiner* — Christopher P Jones
(74) *Attorney, Agent, or Firm* — Roylance, Abrams, Berdo & Goodman LLP

(57) ABSTRACT

A device for drying medium flow (8), in particular an air flow, includes a device housing (2), in which at least first and second drying agents (4, 6) are received. The first and second drying agents have a high moisture absorption capacity in the case of low and high moisture values of the medium flow (8), respectively. The amount of the respective drying agent (4, 6) can be selectively set depending on the actual moisture present in the medium flow (8).

20 Claims, 3 Drawing Sheets

DEVICE FOR DRYING A MEDIUM FLOW

FIELD OF THE INVENTION

The invention relates to a device for drying a medium flow, in particular an air flow, comprising a device housing in which at least one drying agent is received.

BACKGROUND OF THE INVENTION

The generic devices are used, in particular, when a container is supplied with an air flow from the outside. The object is to prevent moisture from infiltrating the container. Such a container can contain, for example, hydraulic oil for supplying a hydraulic system. The infiltration of moisture into the container can lead to a reduction in power or even damage to the attached system. To supply an air flow from the outside, the generic devices have an inlet device, so that, for example, when the level of a medium that is introduced into the container drops, air from the outside can be fed into the container by the device. The medium in the container can decrease, for example, by removal of the medium. In the reverse case—that is, the level of the medium in the container rises and consequently the air flow must be removed from the container to the exterior—the generic devices often have an outlet device, in addition to the inlet device.

Typically, such drying devices use drying agents, which, however, taken by themselves, are only intended to cover one specific area of a preferred application, in particular, as a function of the moisture situation, temperature, and composition of the medium flow to be dried. Therefore, it is necessary to select from the prior art a drying agent that is the most appropriate for the field of application in order to attain the intended effect.

In this respect, DE 100 31 004 B4 discloses a device for ventilating containers that hold air that has been dried by adsorption. In this case, aluminum oxide is introduced into the container as the adsorbing agent. Then the air is fed from the outside through the adsorbing agent into a container which is to be attached, from which an air removal to the exterior is also possible. The arrangement of a plurality of non-return valves ensures in the solution known from the prior art that the container with the moisture adsorbing agent is charged with air only when the air is actively supplied and not when the air is actively removed. In particular, if the attached container contains hydraulic oil, the efficiency of the adsorbing agent would be reduced if it were traversed by oil vapors of the removed air.

EP 0 135 006 A2 also discloses a device for ventilating with dried air. In this case, a silica gel is the drying agent that is introduced into a container supplied with air from the outside by way of a dust filter. After this air has passed through the drying agent, it is fed to a medium conductor, which communicates with the attached container.

SUMMARY OF THE INVENTION

An object of the present invention is to provide an improved device for drying a medium flow that can be easy handled, can be manufactured cost effectively and, in particular, can be adapted in a simple way to a wide range of requirements in the course of drying a medium flow.

This object is basically achieved with a device for drying a medium flow, in particular an air flow, including a device housing in which at least a first drying agent is received. Since the device housing receives not only at least a first drying agent but also at least another drying agent and since at low or high moisture values of the medium flow at least a first drying agent and at least another or second drying agent exhibit a high moisture adsorption capacity, a plurality of requirements that the drying operation of a medium flow must fulfill in the field can be satisfied in a simple way, in particular, because the amount of the respective drying agent can be selectively set as a function of the actual moisture present in the medium flow.

The device housing can have a receiving space receiving at least two drying agents. That receiving space has at least one separating device, which can be traversed by the medium flow and which is provided for separating at least two drying agents. This separation of the drying agents by a separating device allows the drying agents to be largely not mixed together to keep their individual properties. Additionally, this separation also allows an individual exchange of the drying agents, especially if one of the two drying agents has weakened significantly in its effect before the other.

The drying agent can be a molecular sieve—also called a molecular sieve—with a high moisture adsorption capacity at low moisture values of the medium flow. At least another drying agent is a silica gel with a high moisture adsorption capacity at high moisture values of the medium flow. Both the molecular sieve and the silica gel are drying agents that have already proved worthwhile in generic devices because of their high efficiency, but are totally different in their individual properties. For example, a molecular sieve has a high moisture adsorption capacity at low relative moisture values of the medium flow, whereas a silica gel has an especially high moisture adsorption capacity at high relative moisture values of the medium flow. By combining at least two drying agents in a device, it is possible to combine the individual properties of the respective drying agents such that the device for drying the medium flow carries out the drying in the most effective way as a function of the actual moisture present in the medium flow. In particular, this strategy allows the devices for drying the medium flow to be provided with drying agents such that a high moisture adsorption capacity is guaranteed for the medium flow over as wide a range of the relative moisture values of the medium flow as possible.

At least one separating device can be arranged in a selectable manner in the receiving space and divides in this way the receiving space into at least two receiving volumes for receiving at least two drying agents. Since the receiving volume of the receiving space for the respective drying agents can be influenced by the separating device that can be arranged in a selectable manner, the receiving space can be divided in such a way that the division is adapted to one of the intended operating situations, in particular the moisture present in the medium flow, the type of medium flow, the drying agents to be used, etc. Since this division can be performed at the corresponding device—that is, locally—devices can be used which are otherwise identical in design for a wide range of applications, because they can be adapted to the required receiving volumes. Moreover, this design is also inexpensive, because it is possible to keep a large inventory of drying agents, whereas the volume of the drying agent that has to be introduced individually into the receiving space can be established separately for each individual device.

At least one separating device can be arranged at selectable positions in the direction of the longitudinal extent of the receiving space for dividing the receiving space. This feature simplifies the division of the receiving space especially in the case of a cylindrical design of the receiving space with a more or less constant cross-sectional area. The receiving volume of the respective drying agent that can be introduced relative to the total volume of the receiving space can be easily specified as a function of the selected position of a separating device relative position to the longitudinal extent of the receiving space. The result is the individual adaptability of the device, since the division of the receiving space can be carried out individually for each device per se as a function of the selected position of the separating device.

At least one separating device can be designed in the form of a disk and provided with passage openings, which can be traversed by the medium flow. The provision of passage openings, which can be traversed by flow, in separating devices that are designed in the form of disks guarantees that a medium flow can flow through at least one separating device. In this way, a first drying agent and then an additional drying agent can act on the medium flow.

The device housing, being situated on the upstream side of the receiving space, can be provided with at least one inlet device for admitting the medium flow into the device housing from outside the device housing. At least one inlet device empties into an intermediate chamber being arranged outside the receiving space and inside the device housing and being intended for stabilizing the medium masses. For this purpose, the passage openings can be provided with identical or different sizes. The arrangement pattern of identical or different passage openings can be selected to obtain a desired throughflow profile of the separating device that is useful especially for directing the flow as uniformly as possible against a drying agent arranged downstream of the separating device in the direction of flow. In the case of a separating device configured in the form of a circular disk, the passage openings can be defined by radially extending webs and webs that extend in the circumferential direction. The size of the passage openings relative to a center of the separating device increases in the radial direction from the interior to the exterior.

A filter device, in particular in the form of a disk-shaped filter foam for distributing the media, can be situated between the intermediate chamber for stabilizing the medium masses and the upstream side of the receiving space. In this case, the inlet device can be, in particular, an inlet valve, so that although the medium flow enters via the inlet device into the device housing, the flow cannot leave the device housing by way of the inlet device. That function of the inlet device can be implemented, for example, by a non-return valve. The intermediate chambers for stabilizing the air masses also serve to uniformly distribute the medium flow, admitted through the inlet device, in the intermediate chamber, so that the medium flow can exit the chamber in the next phase of the flow route distributed as uniformly as possible over the flow cross-sectional area.

An additional filter device, in particular a filter foam for balancing the packing of the received drying agent, is arranged on the downstream side of the receiving space between it and an end-side closure of the device housing. A filter foam with its non-uniformly distributed pores or more specifically air channels contributes to a uniform distribution of the medium directed against the filter foam, so that this medium leaves the filter foam on the downstream side more or less homogeneously over the flow cross-sectional area. This feature facilitates a uniform flow of the drying agents introduced into the receiving space. Moreover, such filter device can also serve to hold off the fine dust or other contaminants in the medium admitted into the device. Insofar as a drying agent rests in direct contact against the filter foam on the downstream side, the filter foam also effectively prevents the drying agent or individual small particles thereof from exiting the receiving space into the intermediate chamber for stabilizing the air mass. The filter foam is arranged at the upper end of the receiving space and adjacent thereto. Hence, when the receiving space is filled, this filter foam can exert within defined limits a pressure on the poured in drying medium such that even in the course of transporting the device to the site of use, the drying medium will essentially retain its position. In particular, the drying agent introduced will maintain a constant height relative to the longitudinal extent of the receiving space.

The one filter device and the other filter device can be brought into contact with a sieve plate on the side of said filter device that faces away from the receiving space. This support of the one filter device and the other filter device by a sieve plate and, in particular, on the side that faces away from the receiving space further increases the stability of the filter foams. When installed, the filter foam for distributing the medium then is not moved out of its desired position by the drying agent that may be bearing down on it, but rather the filter foam is supported by the sieve plate. Furthermore, the filter foam, located at the top in the installed position and intended for balancing the packing is also mechanically supported by the adjacent sieve plate and is moved into close contact with the drying agent received in the receiving space.

A medium conductor can extend between the sieve plates resting against the one filter device and the other filter device and can extend through the receiving space in the direction of the longitudinal extent of the device housing. The interior of the medium conductor can communicate with a connecting device for connecting the device to a container to be supplied with the dried medium. The dried medium flows via that medium conductor through the device housing in the direction of its longitudinal extent. In the simplest case, the medium conductor is a piece of pipe that has a cylindrical cross-sectional area and that may optionally be provided on its ends with securing structure that simplify its installation in the device housing.

A sleeve-shaped filter element can be arranged in the end-side closure of the device housing. In this case, the sleeve-shaped filter element extends in sealing contact between the sieve plate resting against the other filter device and a cap-shaped limiting element of the device housing designed as an end-side closure. Its interior communicates with the medium conductor. The sleeve-shaped filter element can be, in particular, an air filter element that has a fineness of approximately 3 μm and that, being upstream of the connecting element as the last filter element in the flow direction, performs a fine filtration of the medium before the medium flows into an attached container. In addition, the sleeve-shaped filter element, against which the flow is directed radially from the outside, also carries out a deflection of the flow direction of the medium flow, because this medium flow enters into the medium conductor when it leaves the sleeve-shaped filter element in the axial direction. The cap-shaped limiting element of the device is a conventional end cap of a filter housing that in the present case closes the device housing in a sealing manner against the environment.

The central region of the separating device can be designed in the form of a circle, can rest with its outer wall region against the inner wall of the receiving space, and can have a recess. A flexible edge, formed on the recess and supported on the medium conductor, allows a selective arrangement of the separating device at positions in the direction of the longitudinal extent of the receiving space. The flexible design of the edge of the recess in the separating device permits securing the separating device at the medium conductor such that it is easy to detach. In particular, that design allows the separating device to be slid with ease along the medium conductor and, as a result, makes adapting the receiving volume to the specified boundary conditions easy.

The device housing can be provided with an outlet device outside the receiving space. In this case, a medium flow, issuing from a container attached to the device, can exit the device housing by way of this outlet device to the exterior. In addition, a medium flow can enter the device from the container by way of the connecting device. However, the air column forming in the medium conductor of the device causes such an increase in the pressure that an outlet device, in particular a non-return valve, arranged at the bottom in its installed position in the device housing, is opened in time so that the medium issuing from the container is effectively prevented from entering into the receiving space of the device. The use of a non-return valve as the outlet device also effectively prevents the medium, entering from the environment, from being able to enter directly into the medium conductor through the outlet device and then entering into an attached container, because the corresponding non-return valve blocks in this direction.

The molecular sieve content can range from 10% to 50% and the silica gel content can range from 90% to 50%. Preferably, the molecular sieve content ranges from 25% to 45% and the silica gel content ranges from 75% to 55%. More preferred is a molecular sieve content of approximately 40% and a silica gel content of approximately 60% of the total amount of the drying agents introduced into the receiving space. In particular, a combination of approximately 40% molecular sieve and approximately 60% silica gel results in an especially good profile for the moisture adsorption capacity over a wide range of relative moisture values of the medium flow. The advantage of that combination is that compared to a pure silica gel, that combination of drying agents yields a significantly higher moisture adsorption capacity at relative moisture values of approximately 5 to 40% of the medium flow.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
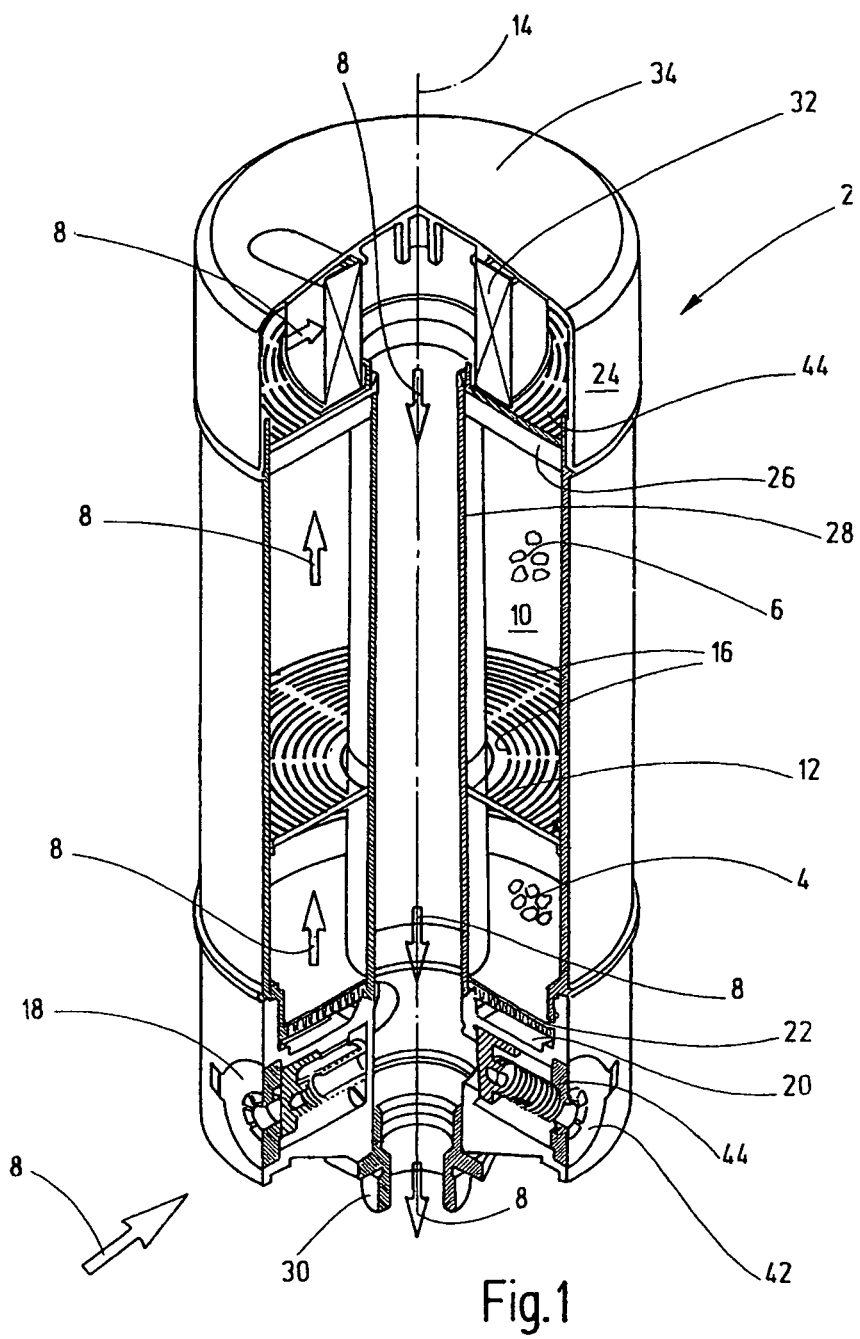
FIG. 1 is a highly simplified perspective view of a drying device that is not drawn to scale and is partially cut, according to an exemplary embodiment of the invention.

FIG. 1 shows a device for drying a medium flow comprising a device housing 2, in which a first drying agent 4 and an additional or second drying agent 6 are received. The first and second drying agents 4, 6 exhibit a high moisture adsorption capacity at low and high moisture values of the medium flow 8, respectively. The amount of each drying agent 4 or 6 is set selectively as a function of the current moisture present in the medium flow 8.

The center section of the device housing 2 has a receiving space 10 for receiving at least two drying agents 4 and 6. In the drawing according to FIG. 1, a separating device 12, which can be traversed by the medium flow 8 and which is provided for separating at least two drying agents 4 and 6 from each other, is mounted on the edge of the lower third of the receiving space 10.

In this case, first drying agent 4 comprises a molecular sieve having a high moisture adsorption capacity at low moisture values of the medium flow 8. The second drying agent 6 comprises a silica gel having a high moisture adsorption capacity at high moisture values of the medium flow 8. Each drying agent is introduced into the receiving space 10.

The separating device 12 can be arranged in a selectable manner in the receiving space 10. The receiving space 10 is divided by the separating device 12 into at least two receiving volumes for receiving at least two drying agents 4, 6. In the drawing according to FIG. 1, a first receiving volume of the receiving space 10 is located underneath the separating device 12. Another or second receiving volume of the receiving space 10 is located above the separating device 12.

The separating device 12 can be arranged at selectable positions in the direction of the longitudinal extent of the receiving space 10, that is, in the direction of its longitudinal axis 14, which coincides with the longitudinal axis of the device housing 2. This feature permits dividing in a selectable manner the receiving space 10 into at least two receiving volumes. In the drawing according to FIG. 1, approximately one-third of the receiving space 10 is provided for receiving the drying agent 4; and approximately two-thirds of the receiving space 10 is provided for receiving the drying agent 6.

The separating device 12 is designed in the form of a disk and has passage openings 16, which can be traversed by the medium flow 8. On the upstream side of the receiving space 10, at least one inlet device 18 is provided for admitting the medium flow from outside the device housing 2 into the device housing 2. In this case, at least one inlet device 18 empties into an intermediate chamber 20, arranged outside the receiving space 10 and inside the device housing 2. The intermediate chamber 20 serves to stabilize the medium masses of the medium flow 8 flowing in through the inlet device 18. In this context, the medium to be dried can be formed, in particular, by air from the surrounding area of the device.

Between the intermediate chamber 20 and the upstream side of the receiving space 10, a first filter device or filter 22 is positioned, serves as the filter foam, and is designed in the form of a disk to distribute the medium of the medium flow 8 flowing out of the intermediate chamber 20. On the downstream side of the receiving space 10 an additional or second filter device or filter 26 is arranged between the receiving space 10 and an end-side closure 24 of the device housing 2. Designed as the filter foam, this additional filter device serves, in particular, to balance the packing of the drying agents 6 or 4 introduced into the receiving space.

FIG. 1 shows that the first and second filter devices 22 and 26 can be brought into contact with a sieve plate 44 on the side of the respective filter device that faces away or is remote from the receiving space 10. The sieve plates 44 can be provided with passage openings traversed by the medium flow 8 in a manner analogous to the separating device 12.

A medium conductor 28 extends through the receiving space 10 in the direction of the longitudinal extent of the device housing, in particular extends coaxially to its longitudinal axis 14. When the device is installed in the preferred position shown in FIG. 1, the medium conductor communicates downward with a connecting device 30 for connecting the device to a container (not illustrated) which is to be supplied with dried medium. The medium conductor 28 extends between the sieve plates 44 that rest against the first and second filter devices 22 and 26.

The end-side closure 24 of the device housing 2 has a cylindrical filter element 32 extending in a sealing manner between the sieve plate 44, resting against the additional filter device 26, and a cap-shaped limiting device 34 of the device housing 2 that is formed on the end-side closure 24. The interior of the filter element communicates with the medium conductor 28. In this case, a seal can be inserted so as to ensure a sealing engagement between the filter element 32 and the cap-shaped limiting device 34 of the device housing 2 and/or the filter element 32 and the sieve plate 44, resting against the additional filter device 26.

FIG. 1 shows that the sieve plates 44 support the first and second filter devices 22 and 26 on their sides facing away from the receiving space 10.

Figure 2:
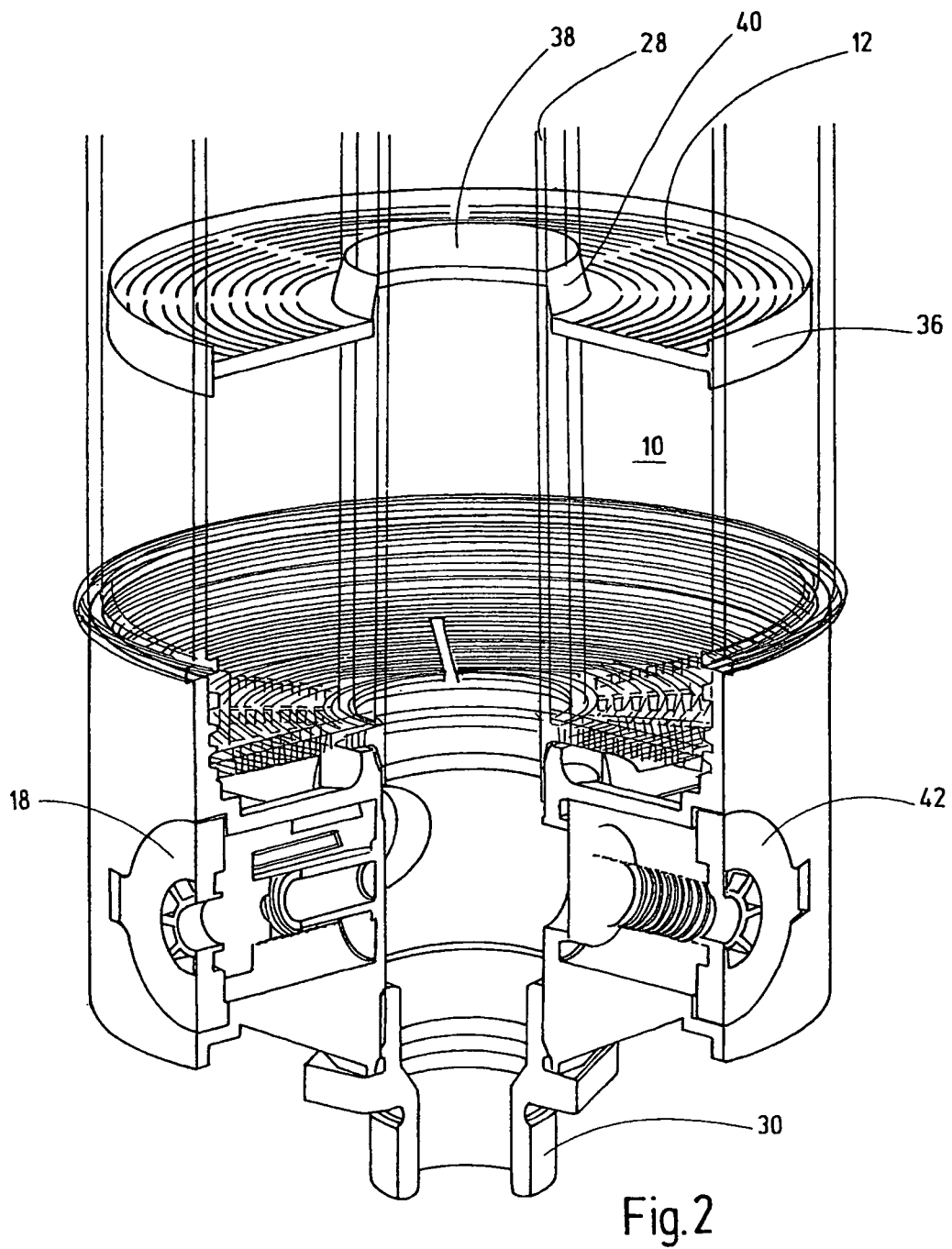
FIG. 2 is an enlarged partial perspective view of the drying device of FIG. 1.

As shown in FIG. 2, the separating device 12 is designed in the form of a circle, rests with its outer wall region 36 against the inner wall of the receiving space 10 and is provided with a recess 38 in its central region. In this case, the recess 38 has an edge, in particular, a flexible edge 40, flexibly supported on the medium conductor 28 to allow the separating device 12 to be arranged in a selectable manner at positions in the direction of the longitudinal extent of the receiving space 10.

Outside the receiving space 10, the lower section (as shown in FIG. 1) of the device housing has an outlet device 42, through which a medium flow, issuing from a container (not illustrated) connected to the device, can exit the device housing 2 to the exterior. Such a medium flow would pass through the connecting device 30 counter to the arrow (depicted there) for the medium flow 8 and would not infiltrate the receiving space 10 due to the air column forming in the medium conductor 28. Rather, such flow would exit the device housing by way of the outlet device 42. In this case, the outlet device 42 can be, in particular, a non-return valve, which effectively suppresses the infiltration of the medium into the device through the outlet device from outside the device, while permitting the medium flow issuing from an attached container to exit by way of the outlet device 42 to the exterior.

Figure 3:
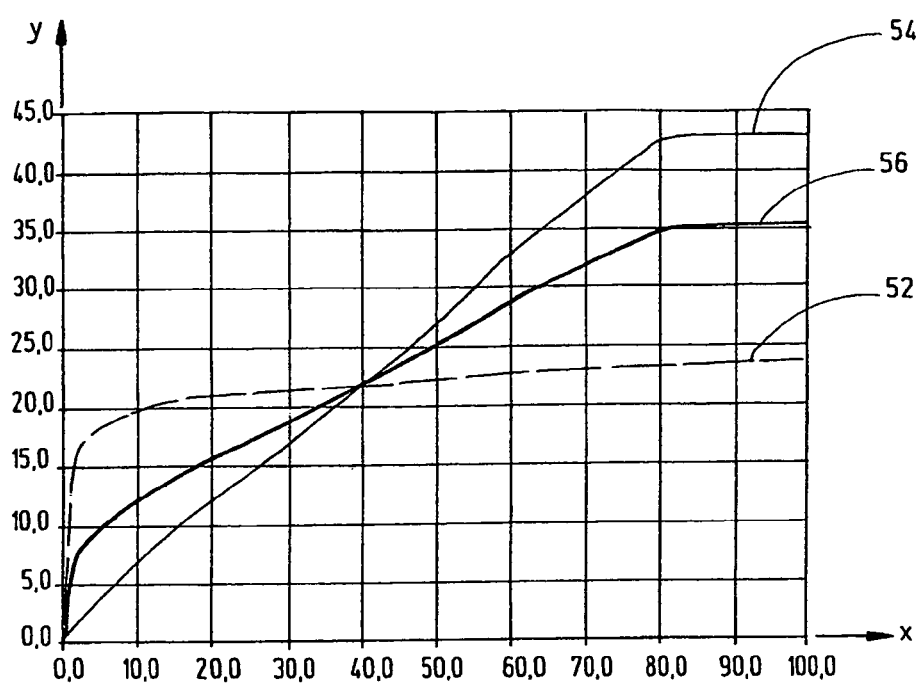
FIG. 3 is a graph showing the adsorption capacity Y of various drying agents as a function of the relative moisture of a medium flow X.

FIG. 3 shows the adsorption capacity or water adsorption Y in percent of a molecular sieve 52, a silica gel 54, and a combination 56 of both drying agents 52 and 54 as a function of the relative moisture X in percent of the medium flow. A feature that has proven to be especially advantageous is the use of a combination of 60% silica gel and 40% molecular sieve. The profile of the water adsorption as a function of the relative moisture of this combination of two drying agents is shown by the curve 56 in FIG. 3. In this case, the high water adsorption of the molecular sieve at low relative moisture values is combined with a high water adsorption of silica gel at high relative moisture values of the silica gel. It is very clear from FIG. 3 that, at a relative moisture value of approximately 40%, the water adsorption of the molecular sieve is about the same as the water adsorption of the silica gel. In the direction of lower relative moisture values, the molecular sieve has a higher water adsorption. In the direction of higher relative moisture values, the silica gel has higher water adsorption. The relatively steep rise in the water adsorption of the molecular sieve even at very low relative moisture values X causes also the combination of the two drying agents to show, at low relative moisture values, a water adsorption capacity that is higher than that of exclusively silica gel. In determining the water adsorption curves shown in FIG. 3, the tapped density for each of the two drying agents was 700 g/l.

While one embodiment has] been chosen to illustrate the invention, it will be understood by those skilled in the art that various changes and modifications can be made therein without departing from the scope of the invention as defined in the appended claims.

What is claimed is:

1. A device for drying a medium flow, comprising:
a device housing having a receiving space therein;
at least one separating device selectively and adjustably positionable in said device housing and traversable by the medium flow, said separating device dividing and separating said receiving space into first and second volumes; and
first and second drying agents having high moisture absorption capacity at low and high moisture values of the medium flow, respectively, being received in said first and second volumes, respectively, and being separated by said separating device;
whereby amounts of said first and second drying agents can be selectively set as a function of actual moisture on the medium flow.

2. A device according to claim 1 wherein
said first drying agent comprises a molecular sieve; and
said second drying agent comprises a silica gel.

3. A device according to claim 1 wherein
said separating device is selectively and adjustably positionable in position along a longitudinal axis of said receiving space.

4. A device according to claim 1 wherein
said separating device has a disk shape and comprises passage openings through which the medium flow can traverse said separating device.

5. A device according to claim 1 wherein
said device housing comprises at least one inlet device situated on an upstream side of said receiving space for admitting the medium flow into said device housing from outside said device housing, said inlet device opening into an intermediate chamber arranged outside of said receiving space and inside said housing device for stabilizing the medium flow.

6. A device according to claim 1 wherein
a first filter is situated in said intermediate chamber.

7. A device according to claim 6 wherein said first filter comprises a disk-shaped filter foam.

8. A device according to claim 6 wherein a second filter is arranged on a downstream side of said receiving space between said receiving space and an end side closure of said device housing.

9. A device according to claim 8 wherein said first and second filters each comprise a disk-shaped filter foam.

10. A device according to claim 8 wherein
said first and second filters contact first and second sieve plates of sides of said first and second filters remote from said receiving space, respectively.

11. A device according to claim 10 wherein
a medium conductor extends between said first and second sieve plates, contacts said first and second filters and extends through said receiving space in a longitudinal direction of said device housing, said medium conductor having an interior in fluid communication with a connecting device connectable to a container to be supplied with dried medium.

12. A device according to claim 11 wherein
a sleeve shaped filter element is arranged in said end-side closure, extends in sealing contact between said second sieve plate and a cap shaped limiting element of said end side enclosure, and has an interior in fluid communication with said medium conductor.

13. A device according to claim 1 wherein
said separating device comprises an outer wall region engaging an inner wall of said device housing and comprises a central region having a recess with a flexible edge formed on said recess, said flexible edge being supported on a medium conductor extending longitudinally within said receiving space of said device housing, engagement of said flexible edge and said conductor allowing selective and adjustable arrangement of said separating device along said medium conductor.

14. A device according to claim 1 wherein
said device housing comprises an outlet outside said receiving space and comprises an outlet allowing medium flow from a container attached to said device housing to exit said device housing to an exterior thereof.

15. A device according to claim 2 wherein
said molecular sieve has a content range of 10 to 50 percent of a total amount of drying agents in said receiving space; and
said silica gel has a content range of 90 to 50 percent of the total amount of drying agents in said receiving space.

16. A device according to claim 2 wherein
said molecular sieve has a content range of 25 to 45 percent of a total amount of drying agents in said receiving space; and
said silica gel has a content range of 75 to 55 percent of the total amount of drying agents in said receiving space.

17. A device according to claim 2 wherein
said molecular sieve has a content range of approximately 40 percent of a total amount of drying agents in said receiving space; and
said silica gel has a content range of approximately 60 percent of the total amount of drying agents in said receiving space.

18. A device according to claim 1 wherein
said first and second drying agents have different moisture capacities.

19. A device according to claim 1 wherein
said first and second drying agents are different materials.

20. A device according to claim 2 wherein
the medium flow is air; and
said air flows through said device housing.

* * * * *